United States Patent [19]
Bosch

[11] 3,949,649
[45] Apr. 13, 1976

[54] ADJUSTING APPARATUS FOR HYDRAULIC PUMPS OR MOTORS

[75] Inventor: Paul Bosch, Ludwigsburg, Germany

[73] Assignee: Robert Bosch G.m.b.H., Stuttgart, Germany

[22] Filed: Apr. 11, 1974

[21] Appl. No.: 460,069

[30] Foreign Application Priority Data
Apr. 14, 1973  Germany............................ 2318915

[52] U.S. Cl. ..................... 91/506; 60/452; 417/218
[51] Int. Cl.$^2$ ............................................ F04B 1/06
[58] Field of Search ........... 417/212, 213, 218, 219, 417/221, 222; 91/506; 60/452

[56] References Cited
UNITED STATES PATENTS

| | | | |
|---|---|---|---|
| 2,502,546 | 4/1950 | Adams | 417/219 |
| 2,669,935 | 2/1954 | Tucker | 417/219 |
| 3,051,092 | 8/1962 | Lambeck | 417/219 |
| 3,327,475 | 6/1967 | Clark | 417/222 |
| 3,644,063 | 2/1972 | Bosch | 417/213 |
| 3,667,867 | 6/1972 | Boydell | 417/222 |
| 3,768,928 | 10/1973 | Miller et al. | 417/222 |
| 3,834,281 | 9/1974 | Heyl | 91/506 |

*Primary Examiner*—William L. Freeh
*Assistant Examiner*—G. P. LaPointe
*Attorney, Agent, or Firm*—Michael J. Striker

[57] ABSTRACT

The rotary piston pump of a hydrostatic transmission for automotive vehicles has a slide block which is shiftable by a plunger in the cylinder of a follow-up control. The plunger is biased against the slide block by pressurized fluid in a chamber of the cylinder and can be shifted under or against the fluid pressure in the chamber by a control valve wherein a reciprocable spool controls the flow of fluid to the chamber from the pressure outlet of the pump. The spool is shifted in response to changes in fluid pressure at the opposite sides of a flow restrictor installed in a conduit which is connected to the outlet of the pump whereby the spool seals the cylinder of the follow-up control from the tank and from the pressure outlet of the pump before the chamber of the cylinder receives pressurized fluid to thereby change the position of the plunger and slide block.

11 Claims, 2 Drawing Figures

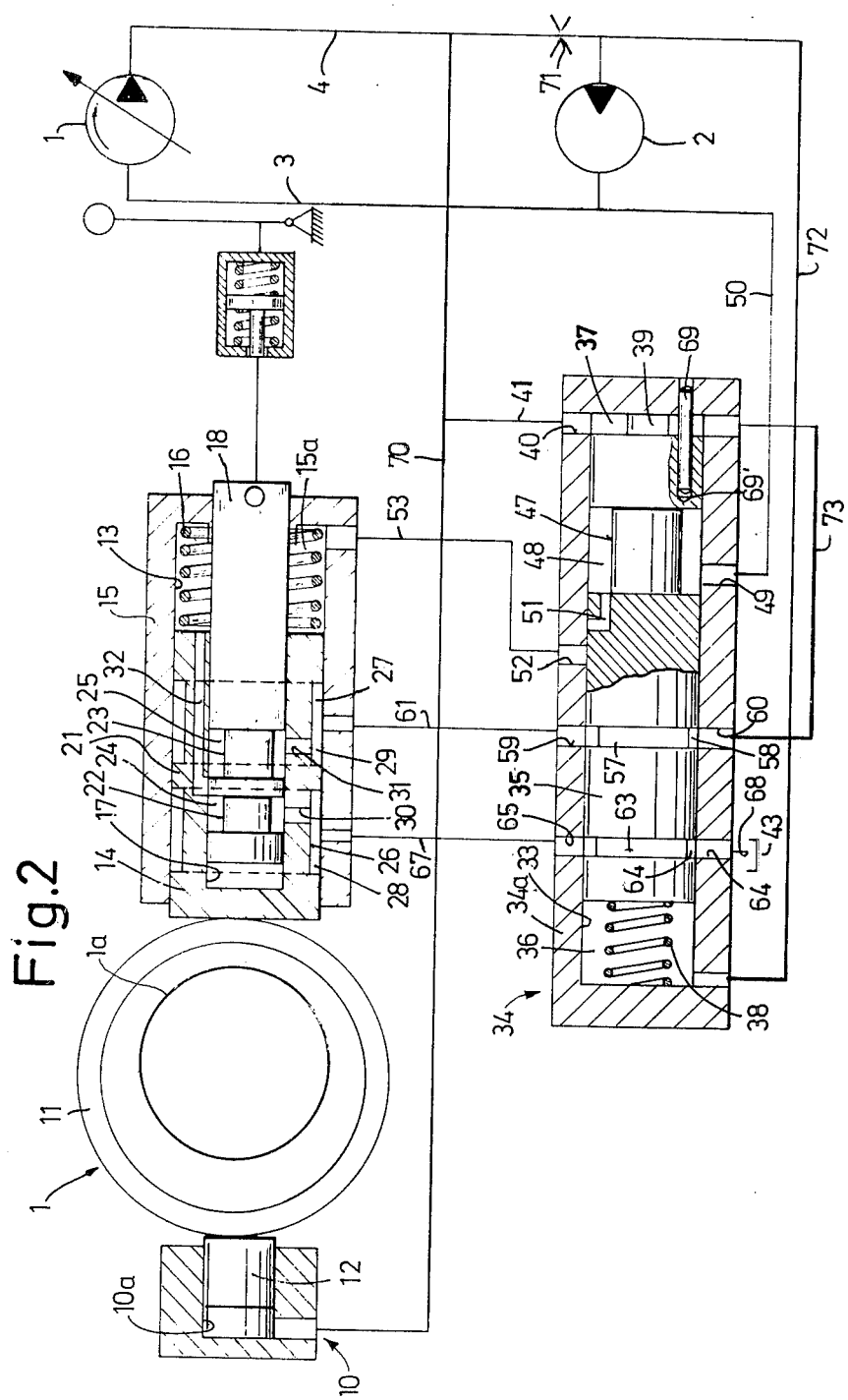

ADJUSTING APPARATUS FOR HYDRAULIC PUMPS OR MOTORS

BACKGROUND OF THE INVENTION

The present invention relates to apparatus for controlling the operation of hydraulic machines which can be used as pumps or motors, and more particularly to improvements in apparatus for adjusting a slide block or an analogous regulating member or device in a hydraulic pump or motor wherein the regulating member influences the throughput, the direction of fluid flow and/or other characteristics of the machine.

It is already known to change the position of the slide block in a hydraulic rotary piston pump or motor by means of a follow-up control wherein one or more plungers serve to change the eccentricity of the slide block with respect to the cylinder block to thereby change the strokes of pistons and/or the direction of fluid flow through the machine. The follow-up control is influenced by a control valve which responds to changes in one or more characteristics of fluid at the outlet of the machine. As a rule, the changes in pressure of fluid at the outlet of the machine are monitored by a flow restrictor and the control valve responds to changes in pressure differential at the opposite sides of the flow restrictor. The control valve can connect the chamber of a cylinder for the plunger of the follow-up control with a source of pressurized fluid or with a reservoir to thereby effect a change in the position of the plunger and slide block. The slide block influences the operation of the machine to thereby change the corresponding characteristic of the fluid at the outlet of the machine so that the pressure differential at the flow restrictor again assumes a value which is within the preselected range.

In certain presently known follow-up controls, the plunger is a differential piston having an axial bore for a reciprocable valve member. When the fluid pressure at the outlet of the machine exceeds a permissible value, such pressure opens a pressure relief valve in a conduit which connects the outlet of the machine with a reservoir and contains a flow restrictor. The pressure differential at the flow restrictor decreases and this results in displacement of the differential piston in a direction to reduce the fluid pressure at the outlet in response to appropriate adjustment of the slide block. As a rule, such opening of the relief valve initiates the establishment of a connection between the chamber of the cylinder for the differential piston and the reservoir so that the chamber can discharge fluid and such fluid allows a shifting of the differential piston for the purpose of reducing the pressure of fluid at the outlet of the machine. The valve member in the differential piston remains at a standstill and cooperates with the displaced differential piston to permit the flow of fluid through a channel which is machined into the differential piston and contains a throttle. Such fluid is maintained at an elevated pressure and flows into a chamber wherein it opposes a return movement of the differential piston. This causes considerable losses in fluid and adversely affects the efficiency of the machine. Proper operation is assured only by appropriate dimensioning of the throttle in the channel of the differential piston. However, the throttle invariably delays the adjustment of follow-up control so that the inertia of the apparatus is considerable and the adjustment is completed with a substantial delay.

SUMMARY OF THE INVENTION

An object of the invention is to provide a novel and improved follow-up control for adjusting the regulating member of a hydraulic machine which can function as a pump or motor.

Another object of the invention is to provide a novel and improved control valve for the follow-up control which adjusts the slide block of a rotary piston pump or motor or an analogous regulating member of a hydraulic machine which can function as a pump or motor.

A further object of the invention is to provide a follow-up control whose reaction to changes in the characteristics of fluid at the high-pressure side of the machine is quicker than in presently known follow-up controls.

An additional object of the invention is to provide a control valve which can be combined with a follow-up control for the regulating members of hydraulic pumps or motors, especially for the slide blocks of radial piston pumps or motors, to insure a rapid, accurate and reproducible adjustment of the regulating member when the characteristics of fluid at the outlet of the machine change for any of a number of different reasons.

Still another object of the invention is to provide a novel operative connection between the control valve and the follow-up control for the regulating member of a hydraulic pump or motor which insures that the control valve cannot interfere with rapid adjustment of the regulating member by the follow-up control.

A further object of the invention is to provide novel and improved means for changing the eccentricity of the slide block in a radial piston pump or motor, especially in a radial piston pump or motor which forms part of a hydrostatic transmission for automative vehicles.

The invention is embodied in an apparatus for adjusting a fluid flow regulating member in a hydraulic machine which can function as a pump or motor, wherein the adjustments of regulating member effect changes in the rate of fluid flow through the machine, and wherein the machine has an inlet for low-pressure fluid and an outlet for high-pressure fluid. The apparatus comprises at least one adjusting device forming part of a follow-up control and having a cylinder and a first valve member which is movable in the cylinder to thereby adjust the regulating member and defines with the cylinder a fluid-filled plenum chamber wherein the fluid urges the valve member against the regulating member (either directly or indirectly), a flow restrictor or analogous means for monitoring the fluid pressure at the outlet of the machine, and valve means for controlling the flow of fluid into and from the plenum chamber of the cylinder in response to deviations of fluid pressure at the outlet of the machine from a predetermined range. The valve means comprises a body, first conduit means normally connects the body with the cylinder of the adjusting device, second conduit means which connects the body with the outlet of the machine, third conduit means which connects the body with the plenum chamber, and a second valve member (e.g., a reciprocable spool) which is movable in the body in response to deviations detected by the monitoring means to thereby seal the first conduit means prior to connecting the second conduit means with the third conduit means.

The first conduit means may include a first pipe which is normally connected with a reservoir and a second pipe which is normally connected with the outlet of the machine.

The novel features which are considered as characteristic of the invention are set forth in particular in the appended claims. The improved control apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is a similar view of a modified apparatus wherein the hydraulic machine can also be operated as a pump or motor but its cylinder block invariably rotates in a single direction.

DESCRIPTION OF THE PREFERRED EMBODIMENTS

Figure 1:
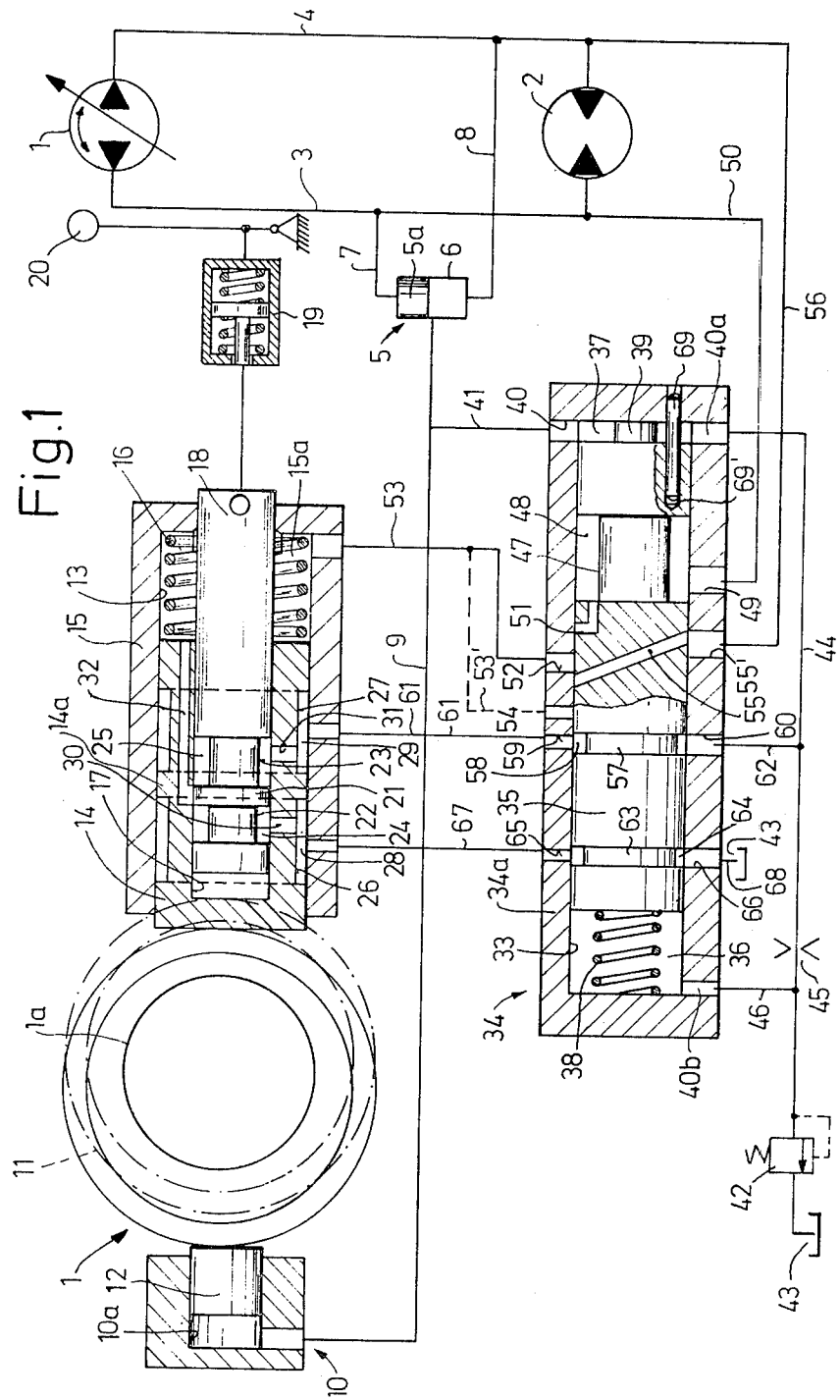
FIG. 1 is a diagrammatic partly elevational and partly sectional view of an apparatus which embodies one form of the invention and wherein the hydraulic machine can be operated as a pump or motor by changing the direction of rotation of its cylinder block.

Referring first to FIG. 1, there is shown a control apparatus which is used in combination with a radial piston pump 1. The pump 1 cooperates with a hydraulic motor 2 to form therewith a hydrostatic transmission and its outlet and inlet are respectively connected with the motor by conduits 3 and 4. A two-way check valve 5 has a double-acting cylinder 6 which is connected with the conduits 3, 4 by pipes 7, 8 and contains a piston 5a which can seal the pipe 7 or 8 from a conduit 9. The latter communicates with the chamber 10a of a first adjusting cylinder 10 for the slide block 11 of the radial piston pump 1. The slide block 11 constitutes a regulating member of the pump 1 and can be shifted sideways by a plunger 12 which seals one end of the chamber 10a in the first adjusting cylinder 10. The manner in which adjustments of the slide block 11 change the strokes of radial pistons in the rotary portion or cylinder block 1a of the pump 1 is well known from the art of such machines.

The plunger 12 is located diametrically opposite a valve member or plunger 14 which forms part of a follow-up control system and is reciprocable in the bore 13 of a second adjusting cylinder 15. A helical spring 16 in a plenum chamber 15a of the second adjusting cylinder 15 urges the valve member or plunger 14 against the slide block 11. The bias of the spring 16 is assisted by fluid pressure in the chamber 15a.

The plunger 14 has an axial bore 17 for a valve member or spool 18 which is shiftable axially by a lever 20 through the medium of a dashpot 19 or analogous yieldable motion transmitting means. That portion of the spool 18 which extends into the plunger 14 has two circumferential grooves 22, 23 which are separated from each other by a ring-shaped land 21. The grooves 22, 23 define with the surface surrounding the bore 17 two annular compartments 24 and 25. The peripheral surface of the plunger 14 is also formed with two circumferential grooves 26, 27 which are separated from each other by a ring-shaped land 14a and form with the surface surrounding the bore 13 a pair of annular compartments 28, 29.

A radial bore 30 of the plunger 14 establishes communication between the compartments 24, 28, and a similar radial bore 31 of the plunger 14 connects the compartments 25, 29. A channel 32 in the plunger 14 communicates with the chamber 15a and with the bore 17. That end of the channel 32 which is provided in the surface surrounding the bore 17 is sealed by the land 21 of the spool 18 when the plunger 14 assumes its neutral position.

A control valve 34 has a housing or body 34a for a reciprocable valve member or spool 35. The spool 35 is reciprocable in an axial bore 33 of the body 34a and is disposed between two chambers 36, 37 which constitute the end portions of the bore 33. The chamber 36 contains a helical spring 38 which urges the spool 35 in a direction to the right, as viewed in FIG. 1. The bias of the spring 38 is assisted by fluid pressure in the chamber 36. A smaller-diameter end portion or stub 39 of the spool 35 in the chamber 37 can abut against the right-hand end wall of the body 34a when the bias of the spring 38, combined with fluid pressure in the chamber 36, suffices to shift the spool 35 to the right-hand end position (starting position) of FIG. 1. Thus, the plunger 35 cannot seal the inner end of a radial bore 40 which is machined into the body 34a and is connected with the conduit 9 by a conduit 41. The body 34a has a second radial bore 40a which is connected with a reservoir or tank 43 by a return conduit 44; the latter contains an adjustable pressure relief valve 42. The valve 42 is located downstream of a fluid pressure monitoring device here shown as a flow restrictor 45. A further radial bore 40b of the body 34a communicates with the chamber 36 and is connected with the conduit 44 by a conduit 46. The conduit 46 communicates with the conduit 44 between the flow restrictor 45 and relief valve 42.

The spool 35 has a circumferential groove 47 which defines with the surface surrounding the bore 33 a ring-shaped compartment 48 communicating with a radial bore 49 of the body 34a. The bore 49 is connected with the conduit 3 by a conduit 50. The spool 35 is further formed with a first channel 51 one end of which communicates with the compartment 48 and the other end of which terminates in the periphery of the spool 35. When the spool 35 is shifted axially in a direction to the left, as viewed in FIG. 1, the left-hand end of the first channel 51 can communicate with a radial bore 52 of the body 34a. The bore 52 is connected with the chamber 15a of the cylinder 15 by a control conduit or line 53. In a predetermined axial position of the spool 35, the radial bores 49 and 52 of the body 34a communicate with each other by way of the channel 51 and compartment 48; the chamber 15a is then in communication with the conduit 3.

If the cylinder block of the pump 1 rotates in a counterclockwise direction, the control conduit or line 53 is replaced by a control conduit or line 53' a portion of which is indicated by a broken line and which connects the chamber 15a of the cylinder 15 with a radial bore 54 of the body 34a. The bore 52 of the body 34a is then sealed by a plug or the like. A transversely extending second channel or passage 55 of the spool 35 can connect the bore 54 with a further radial bore 55' of the body 34a. The bore 55' is connected with the conduit 4 by a conduit 56.

A circumferential groove 57 of the spool 35 defines with the surface surrounding the bore 33 an annular compartment 58 which establishes communication between two radial bores 59, 60 of the body 34a when the stub 39 of the spool 35 abuts against the right-hand end wall of the body 34a. The bore 59 is connected with the compartment 29 by a control conduit or pipe 61, and the bore 60 is connected with a conduit 62 which communicates with the return conduit 44 upstream of the flow restrictor 45.

A further circumferential groove 63 of the spool 35 defines with the surface surrounding the bore 33 an annular compartment 64 which connects two radial bores 65, 66 of the body 34a when the spool 35 dwells in the position of FIG. 1. The bore 65 is connected with the compartment 28 by a conduit or pipe 67, and the bore 66 is connected with the tank 43 by a conduit or pipe 68.

The diameter of the bore 59 equals the width of the groove 57 and the diameter of the bore 65 equals the width of the groove 63. The distance between the left-hand end of the channel 51 and the bore 52 equals the distance between the upper end of the passage 55 and the bore 54; this distance exceeds the diameter of the bore 59 or 65.

The right-hand end wall of the body 34a is rigid with an axially parallel stud 69 whose shank extends into a recess 69' of the spool 35. The stud 69 is preferably threadedly connected with the body 34a and serves as a means for preventing rotation of the spool 35, i.e., the spool 35 is confined to axial movements in the bore 33.

If the cylinder block of the pump 1 rotates clockwise, the conduit 4 is assumed to contain pressurized fluid and the pressure of fluid in the conduit 3 is less. The pressurized fluid flows from the conduit 4, through the conduit 8 and moves the piston 5a to the end position shown in FIG. 1 so that the conduit 8 communicates with the conduit 9. The piston 5a then seals the conduits 3 and 7 from the conduit 9. The check valve 5 insures that the chamber 10a of the cylinder 10 is always connected with that one of the conduits 3, 4 wherein the fluid pressure is higher.

The conduit 41 which branches from the conduit 9 admits highly pressurized fluid into the chamber 37 of the body 34a, and such fluid is free to leave the chamber 37 by flowing through the conduit 44, conduit 62, compartment 58, control conduit or pipe 61, and into the compartment 29. In a given position of the valve member 18, the fluid can flow through the channel 32 and into the chamber 15a to effect a movement of the plunger 14 in a direction to the left. The operation of the follow-up control system is assumed to be known and is not described in greater detail.

The fluid leaving the chamber 37 via the fourth conduit 44 further flows through the flow restrictor 45 and enters the conduit 46 which admits such fluid into the chamber 36. The pressure in the chamber 36 equals the pressure at the outlet of the pump 1 when the relief valve 42 is closed. Therefore, the spring 38 (assisted by fluid pressure in the chamber 36) is capable of moving the spool 35 to the position shown in FIG. 1 whereby the fluid in the chamber 37 opposes such movement of the spool 35.

If the pressure at the outlet of the pump 1 exceeds a predetermined value which is selected by the setting of the adjustable relief valve 42, the pressure of fluid in the conduit 44 rises sufficiently to open the valve 42 and to allow fluid to flow into the tank 43. The flow restrictor 45 reduces the pressure of fluid in the conduit 44 and, therefore, the fluid pressure in the chamber 36 drops so that such pressure, combined with the bias of the spring 38 in the chamber 36, does not suffice to maintain the spool 35 in the position of FIG. 1 against the opposition of fluid pressure in the chamber 37. The spool 35 leaves its starting position and moves in a direction to the left whereby it seals the bores 59 and 65 of the body 34a before the left-hand end of the first channel 51 reaches the bore 52. When the channel 51 communicates with the bore 52, the chamber 15a communicates with the low-pressure conduit 3 by way of the conduit or line 53, channel 51 and conduit 50. Thus, fluid can flow from the chamber 15a and the plunger 12 shifts the plunger 14 in a direction to the right, as viewed in FIG. 1, through the medium of the slide block 11. The slide block 11 then shortens the strokes of pistons in the cylinder block 1a of the pump 1 so that the fluid pressure in the conduit 4 drops. The valve member 18 retains its axial position while the plunger 14 moves in response to rightward movement of the slide block 11, as viewed in FIG. 1. Therefore, the channel 32 communicates with the compartment 25 but with no immediate effect because the bores 59 and 65 of the body 34a are sealed by the spool 35. The rightward movement of the plunger 14 continues until the fluid pressure in the conduit 4 drops sufficiently to allow for automatic closing of the pressure relief valve 42 in the return conduit 44. The fluid pressure in the chamber 36 rises as soon as the valve 42 closes so that the pressure of fluid in the chamber 36 equals the pressure at the outlet of the pump 1. Therefore, the fluid in the chamber 36 assists the springs 38 in moving the spool 35 back to the position shown in FIG. 1 in which the spool 35 seals the bore 52 and exposes the bores 59 and 65. The conduit 62 then admits fluid into the conduit or line 61 by way of the compartment 58, and such fluid flows into the chamber 15a by way of the compartments 29, 25 and channel 32. The highly pressurized fluid in the chamber 15a causes the plunger 14 to move in a direction to the left and to displace the slide block 11 whereby the latter enables the pistons of the pump 1 to perform longer strokes, i.e., the rate of fluid flow through the pump 1 increases.

If the fluid pressure in the conduit 4 rises at a very rapid rate, for example, because the inertia of the apparatus is high enough to prevent rapid shifting of the slide block 11, the spool 35 is moved in a direction to the left, as viewed in FIG. 1, to such an extent that the groove 47 connects the bores 49 and 55' of the body 34a. The conduits 3 and 4 are then connected with each other by way of the conduits 50 and 56 so that the fluid can bypass the pump 1 and the fluid pressure in the conduit 4 drops.

If the pump 1 operates at times as a hydraulic motor (while its cylinder block 1a continues to rotate in the same direction), for example, when the hydrostatic transmission is installed in a vehicle and the vehicle is coasting, the conduit 3 becomes the high-pressure conduit and, when the pressure relief valve 42 opens, the conduit 3 admits fluid to the chamber 15a by way of the conduit 50, compartment 48, channel 51 and conduit or line 53. The plunger 14 shifts the slide block 11 in a direction to the left, as viewed in FIG. 1, while the spool 35 seals the bores 59 and 65. The rate of fluid flow through the pump 1 (which operates as a motor) increases so that the fluid pressure drops.

If the slide block 11 assumes the phantom-line position of FIG. 1 (while the cylinder block 1a of the pump 1 continues to rotate in the same direction), the conduit 3 becomes the high-pressure conduit because the slide block 11 moves to the other side of its neutral position. When the relief valve 42 opens, pressurized fluid flows into the chamber 15a in the same way as when the pump 1 is operated as a motor. This causes the slide block 11 to move in a direction to the left and to reduce the rate of fluid throughput.

If the cylinder block 1a of the pump 1 rotates counterclockwise while the slide block 11 assumes the solid-line position of FIG. 1, the conduit 3 is the high-pressure conduit and the bore 54 of the body 34a is then connected with the conduit or line 53'. When the relief valve 42 opens, the spool 35 moves in a direction to the left, as viewed in FIG. 1, for the same reasons as explained above. The passage 55 then connects the bores 54 and 55' while the spool 35 seals the bores 59 and 65. The fluid flows through the conduit or line 53', passage 55 and conduit 56 to the conduit 4 wherein the fluid pressure is lower whereby the plunger 14 begins to move in a direction to the right.

The control system is just as effective if the pump 1 is operated as a motor while its cylinder block 1a rotates counterclockwise. This also applies for the condition when the slide block 11 assumes the phantom-line position of FIG. 1. This will be readily understood upon perusal of the preceding description.

FIG. 2 shows a modified apparatus wherein the cylinder block of the pump 1 can rotate in a single direction. All such parts of this modified apparatus which are identical with or clearly analogous to the corresponding parts of the first apparatus are denoted by similar reference characters. The modified apparatus serves to regulate the throughput of the pump 1.

The conduit 4 (wherein the fluid pressure is higher than in the conduit 3) communicates with a conduit 70 which is connected to the chamber 10a of the first adjusting cylinder 10. The conduit 41 branches from the conduit 70 and communicates with the right-hand chamber 37 in the body 34a of the control valve 34. Thus, fluid pressure in the chamber 37 invariably equals the pressure at the outlet of the pump 1. An adjustable monitoring means or flow restrictor 71 is installed in the conduit 4 between the inlet of the motor 2 and the junction of the conduits 4, 70.

The conduit 4 should constitute the high-pressure conduit at all times because it is undesirable to produce a pressure drop in the section conduit 3. Consequently, the direction of rotation of the cylinder block 1a in the pump 1 is constant and the eccentricity of the slide block 11 is also constant, i.e., the slide block 11 can change its position but only at one side of the axis of the cylinder block 1a in the pump 1. It is assumed that the cylinder block 1a of the pump 1 rotates clockwise and that the axis of the slide block 11 is located to the left of the axis of the cylinder block, as viewed in FIG. 2.

A further conduit 72 communicates with the conduit 4 downstream of the flow restrictor 71 and its discharge end admits fluid into the chamber 36 of the body 34a. The bore 60 of the body 34a is connected with the chamber 37 by a conduit 73. Since the conduit 4 always communicates with the outlet of the pump 1, the passage 55 of FIG. 1 can be omitted together with the bores 54, 55' of the body 34a and conduit or line 53'.

When the pump 1 is in operation, the pressure of fluid in the chamber 37 equals the fluid pressure in the conduit 4 upstream of the flow restrictor 71, and the fluid pressure in the chamber 36 equals the fluid pressure downstream of the flow restrictor 71. The difference between these pressures is compensated for by the spring 38 in the chamber 36 as long as the rate of fluid flow through the pump 1 does not exceed a preselected value. The stub 39 of the spool 35 then abuts against the right-hand end wall of the body 34a. If the rate of fluid flow exceeds the preselected value, the pressure drop at the flow restrictor 71 increases so that the fluid pressure in the chamber 37 overcomes the bias of the spring plus the pressure of fluid in the chamber 36 and the spool 35 moves in a direction to the left, as viewed in FIG. 2. During a first stage of such leftward movement of the spool 35, the latter seals the bores 59 and 65 of the body 34a. As the spool 35 continues to move against the opposition of the spring 38, the left-hand end of the channel 51 moves into register with the bore 52 to connect the chamber 15a with the low-pressure conduit 3 via conduit or line 53, compartment 48 and conduit 50. Thus, fluid can escape from the chamber 15a so that the plunger 14 moves in a direction to the right and the slide block 11 reduces the throughput of the pump 1. The plunger 14 then causes the left-hand end of the channel 32 to move out of register with the land 21 of the valve member 18 whereby the chamber 15a communicates with the control conduit or pipe 61. When the throughput of the pump 1 is reduced to such an extent that the pressure drop at the opposite sides of the flow restrictor 71 is again within a preselected range, the spring 38 (aided by fluid pressure in the chamber 36) returns the spool 35 to the starting position of FIG. 2. The spool 35 seals the bore 52 of the body 34a to terminate the outflow of fluid from the chamber 15a via conduit or line 53. As the plunger 35 continues to move back toward the starting position of FIG. 2, the grooves 57, 63 respectively connect the bores 59, 60 and 64, 65 so that the control conduit or line 61 is connected with the high-pressure conduit 4 and the conduit or line 67 communicates with the tank 43. The chamber 15a receives pressurized fluid from the conduit 4 via control conduit or line 61 and channel 32; therefore, the plunger 14 is shifted in a direction to the left and the eccentricity of the slide block 11 increases to increase the throughput of the pump 1. the slide block 11 comes to a halt when the throughput reaches the permissible value; the spool 35 then assumes a position in which the chamber 15a is sealed and the plunger 14 is at a standstill.

If the pump 1 is operated as a motor, e.g., if the hydrostatic transmission 1,2 is installed in a vehicle and the vehicle is coasting, the pressure of fluid in the conduit 3 rises above that in the conduit 4. The control system responds in a manner as described above to shift the slide block 11 in a direction to the left. Thus, the eccentricity of the slide block 11 increases and the rate of fluid flow into the pump 1 also increases. The RPM decreases so that the pump 1 (which acts as a motor) produces a more pronounced braking action.

The purpose of the plunger 12 in the first adjusting cylinder 10 is to maintain the slide block 11 in abutment with the plunger 14. The lever 20 serves to effect an adjustment of the slide block 11 independently of the pressure of fluid in the conduit 3 or 4, i.e., at the inlet or outlet of the pump 1.

The pipes 61 and 67 constitute a first conduit means which connects the body 34a with the adjusting cylinder. The conduits 8, 9, 41 or 70, 41 constitute a second conduit means which connects the body 34a with the outlet of the pump 1, and the lines 53, 53' or the line 53 can be said to constitute a third conduit means which connects the body 34a with the chamber 15a. The connection between the second and third conduit means is established by spool 35 after the latter seals the pipes 61, 67 of the first conduit means. This insures that the adjustment of plunger 14 by the control valve 34 cannot be influenced by the follow-up control. On the other hand, the control valve 34 cannot influence the speed of adjustment of the slide block 11 by the follow-up control when the latter is actuated via lever 20. Also, the losses in pressurized fluid are minimal when the plunger 14 is shifted by the control valve 34.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. Apparatus for adjusting a fluid flow regulating member in a hydraulic machine which can operate as a pump or motor, wherein the adjustments of said regulating member effect changes in the rate of fluid flow through the machine, and wherein said machine has working chambers, an inlet for admission of fluid to said working chamber at a first pressure and an outlet for evacuation of fluid from said working chamber at a different second pressure, comprising at least one adjusting device having a cylinder and a first valve member movable in said cylinder to thereby adjust said regulating member, said cylinder and said valve member defining a fluid-filled chamber wherein the fluid urges said valve member against said regulating member; means for monitoring the fluid pressure at the outlet of said machine; and control valve means for controlling the flow of fluid into and from said fluid-filled chamber in response to deviations of fluid pressure at said outlet from a predetermined range, including a body, first conduit means normally connecting said body with said cylinder, second conduit means connecting said outlet with said body, third conduit means connecting said body with said fluid-filled chamber, and a second valve member movable in said body in response to said deviations to thereby seal said first conduit means prior to connecting said second conduit means with said third conduit means.

2. Apparatus as defined in claim 1, further comprising means for moving said first valve member independently of said valve means.

3. Apparatus as defined in claim 1, wherein said monitoring means comprises a flow restrictor.

4. Apparatus as defined in claim 1, further comprising a reservoir, said first conduit means including a first pipe which normally communicates with said reservoir and a second pipe which normally communicates with said outlet.

5. Apparatus as defined in claim 1, wherein said monitoring means comprises a flow restrictor and said second valve member is displaceable in said body in response to changes in the drop of fluid pressure at said flow restrictor.

6. Apparatus as defined in claim 1, further comprising a reservoir, fourth conduit means connecting said outlet with said reservoir, and normally closed pressure relief valve means in said fourth conduit means, said monitoring means comprising a flow restrictor provided in said fourth conduit means upstream of said pressure relief valve means.

7. Apparatus as defined in claim 6, wherein said second valve member is reciprocable in said body and defines therewith a first and a second chamber, said first chamber being in communication with said outlet and said second chamber communicating with said fourth conduit means between said flow restrictor and said pressure relief valve.

8. Apparatus as defined in claim 7, further comprising resilient means for assisting the fluid pressure in said second chamber of said body.

9. Apparatus as defined in claim 1, further comprising a reservoir, said first conduit means comprising a first pipe normally communicating with said reservoir and a second pipe normally communicating with said outlet, said second valve member defining with said body a first compartment normally connecting said first pipe with said reservoir and a second compartment normally connecting said second pipe with said outlet, said second valve member further having at least one channel which connects said third conduit means with said second conduit means while said second valve member maintains said compartments out of register with the respective pipes.

10. Apparatus as defined in claim 9, wherein said second valve member is reciprocable in said body to and from a starting position in which said channel is out of register with at least one of said second and third conduit means and said second valve member moves said compartments out of register with the respective pipes before said channel connects said second and third conduit means in response to movement of said second valve member from said starting position.

11. Apparatus as defined in claim 9, wherein said second valve member comprises first and second channels and is movable to and from a starting position in which said first and second compartments respectively register with said first and second pipes and said channels are out of register with at least one of said second and third conduit means, said machine having a portion rotatable in a first direction in which the pressure at said outlet exceeds the pressure at said inlet and in a second direction at which the pressure at said inlet exceeds the pressure at said outlet, said third conduit means comprising a first and a second line and said first channel connecting said first line with said second conduit means and said second channel connecting said second line with said second conduit means while said second valve member maintains said compartments out of register with the respective pipes and said portion of said machine respectively rotates in said first and second directions.

* * * * *